United States Patent [19]

Jueneman

[11] 4,292,683

[45] Sep. 29, 1981

[54] GUARD BAND REDUCTION IN OPEN LOOP TDMA COMMUNICATIONS

[75] Inventor: Robert R. Jueneman, Gaithersburg, Md.

[73] Assignee: Satellite Business Systems, McLean, Va.

[21] Appl. No.: 92,242

[22] Filed: Nov. 6, 1979

[51] Int. Cl.³ .............................................. H04J 3/06
[52] U.S. Cl. .................................................... 370/104
[58] Field of Search .................... 370/104; 455/12, 11, 455/54

[56] References Cited

U.S. PATENT DOCUMENTS

| | | | |
|---|---|---|---|
| 3,566,267 | 2/1971 | Golding | 370/104 |
| 3,922,496 | 11/1975 | Gabbard | 370/104 |
| 4,117,267 | 9/1978 | Haberle | 370/104 |

*Primary Examiner*—David L. Stewart

*Attorney, Agent, or Firm*—Pollock, Vande Sande & Priddy

[57] ABSTRACT

An open loop TDMA communications system includes a transponder located on a spacecraft in quasi-synchronous earth orbit; a reference station periodically transmits a timing marker through said transponder to a plurality of geographically separated earth stations. Spacecraft position varies within controlled limits, and at any time the reference station has available to it information respecting the spacecraft's position. The reference station transmits, along with the timing marker, a spacecraft position index signal which is received at the geographically separated stations. Each of the stations detects the spacecraft position index signal, and based on its own geographic location, translates the spacecraft position index into a transmit timing adjustment. The transmit timing adjustment is employed to vary transmit timing from nominal and to thereby reduce the extent of the guard time used to ensure non-overlapping of bursts from the plurality of stations at the transponder.

5 Claims, 5 Drawing Figures

REF. STATION

GUARD BAND REDUCTION IN OPEN LOOP TDMA COMMUNICATIONS

FIELD OF THE INVENTION

The present invention relates to improvements in open loop TDMA communications systems.

BACKGROUND OF THE INVENTION

One of the known techniques employed in satellite communications systems is TIME DIVISION MULTIPLE ACCESS. In this arrangement, a plurality of geographically separated earth stations employ the full bandwidth of a transponder located on board a spacecraft, in time multiplex fashion so that at any one time, only a single station's transmissions are received at the trasponder, but over a period of time (the TDMA frame), transmissions from each of a plurality of stations pass through the transponder. Although this type of communication regime has associated with it a well-developed body of art, see Sekimoto U.S. Pat. No. 3,320,611; Golding U.S. Pat. No. 3,566,267; and Gabbard U.S. Pat. No. 3,922,496, typically the timing systems are operated in a closed loop fashion. That is, more particularly, each station desiring to transmit has a predetermined time slot in the frame in which its transmission bursts should be positioned. Each station individually monitors the position of its own burst in the frame and corrects for any misalignment. The corrections thus are effective to eliminate timing errors due not only to terrestrial equipment, but also serve to correct for timing errors produced as a result of spacecraft motion and the resulting range variations.

The prior art has also suggested the use of simpler earth stations in which closed loop operation is eliminated. In the prior suggestions for what is thus termed "open loop" TDMA systems, each station employs a fixed nominal factor to compensate for propagation delays which factor was based upon the geographic location of the station and therefore the nominal satellite propagation delays.

In order to take into account expected variations in range, a guard band of some minimum time is employed between bursts emanating from different stations. Guard bands are employed in both closed and open loop TDMA systems, although in the former systems, the guard band between bursts is of relatively small duration since it is only necessary to compensate for equipment generated timing errors. In the prior open loop TDMA system referred to, however, a minimum guard band was equal to twice the variations in propagation delay produced as a result of the largest range variation.

Since the total guard time throughout a frame is the time during which transmissions are not occurring at any station, it represents a measure of communication capacity not being employed and therefore desirably should be minimized. It will be appreciated by those skilled in the art that the relative importance of this wasted communication capacity increases as the baud rate of the transmissions increases. One technique typically employed to minimize the effect of guard time is to lengthen the frame since, as the frame is lengthened, the percentage of frame time devoted to guard time is reduced and thus, efficiency is increased. A difficulty with increasing the frame duration is that it necessarily increases the size of the burst memories required at each of the stations and also increases the delay encountered in communication between one station and another.

It is therefore one object of the present invention to provide an open loop TDMA communications system in which guard time requirements are reduced below that required for prior art open loop TDMA communications systems. It is another object of the present invention to provide, in an open loop TDMA communications system, transmit timing adjustments for at least a plurality of the stations, which timing adjustments are made based on a satellite position index signal. It is another object of the present invention to provide an open loop TDMA communications system in which a transponder is located on a spacecraft in quasi-synchronous earth orbit and in which a reference station transmits a spacecraft position index signal, receivable at a plurality of stations which is employed to make transmit timing adjustments. It is a further object of the present invention to provide an open loop communications system in which transmit timing adjustments are made at each of a plurality of geographically separated stations based on a spacecraft position index signal, which transmit timing adjustments are uniquely related to the station's geographical position.

These and other objects of the invention will become apparent in the course of the following description of preferred embodiments of the invention.

SUMMARY OF THE INVENTION

In order to meet the objects of the invention, the present invention provides, in an open loop TDMA communications system including a transponder on board a spacecraft in quasi-synchronous earth orbit, a reference station, and a plurality of geographically separated earth stations, in which the reference station periodically transmits a timing marker through the transponder from which each of the stations derive TDMA transmit timing, with apparatus to reduce the frame guard time required as a result of spacecraft motion comprising:

means for transmitting, through the transponder, a spacecraft position index signal, and TDMA transmit timing adjustment means located at a plurality of the stations, each of said means including receiving means for receiving said spacecraft position index signal, means responsive to said spacecraft position index signal for determining corresponding timing adjustment unique at each of said stations, said timing adjustment determined by said position index and the geographical location of the associated station, and means responsive to said timing adjustment for effecting a corresponding advancement or retardation of station TDMA transmit timing.

BRIEF DESCRIPTION OF THE DRAWINGS

The invention will now be described in connection with preferred embodiments in connection with the attached drawings in which like reference characters identify identical apparatus and in which.

DESCRIPTION OF PREFERRED EMBODIMENTS

A spacecraft in nominally geosynchronous or quasi-synchronous orbit actually wobbles in a complex Lissajous pattern over a twenty-four (24) hour period as a result of slight inclination and eccentricity of the orbit. Over a period of several days, this pattern gradually drifts eastward toward 105° W. as a result of lunar drag, and other second order effects. In one proposed system, for example, a station keeping maneuver is performed in order to reverse this motion, e.g., the spacecraft is driven westward, slows to a relative stop and again begins drifting eastward.

A result of these motions is spacecraft motion within an angular box which, in one proposed system, is expected to be nominally ±0.03°, ±0.05°, worst case.

In addition to this type of motion, there is also a radial component of motion such that the angular box moves toward and away from the earth as the spacecraft travels from perigee to apogee and back again.

In one proposed TDMA system, in order to provide earth stations with a relatively accurate range estimate for acquisition purposes, a station is provided with apparatus to continuously monitor spacecraft range. Periodically, a range measurement is transmitted from the measuring station to all other stations in order to provide them with a relatively accurate range measurement. The range actually measured is, of course, the range between the measuring station and the spacecraft, whereas, because of the geographic separation of the stations, the actual range from the various stations to the spacecraft at the time of measurement will, of course, differ. Accordingly, the measuring station, following the measurement, transforms the range measurement to determine spacecraft range from a reference location which is typically selected near the geographic center of the stations. The range measurement actually transmitted is this translated range. Accordingly, each of the stations has available to it, and can accordingly compensate for, radial change in the spacecraft position.

Because the range measuring station is usually the reference station, and the identity of that station changes with time, it can be expected that the range measurement will have associated with it an error which will differ depending upon the particular station employing that measurement.

The spacecraft position index signal is used to reduce this error which, at the same time, allows the guard time to be reduced.

Figure 1A:
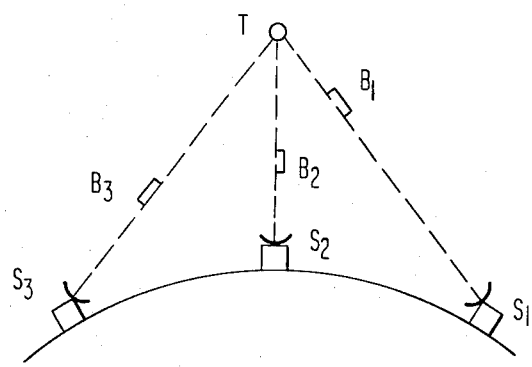
FIG. 1A is a representation of a TDMA communication system.
Figure 1B:
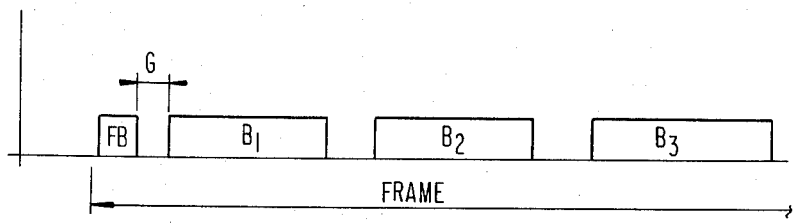
FIG. 1B represents a typical TDMA frame or position thereof.

As shown in FIG. 1A, a typical TDMA system comprises a plurality of stations $S_1$–$S_3$. Each of the stations may transmit, in burst form, to the spacecraft carried transponder T, which then retransmits; the transponder's transmission is available at each of the stations. FIG. 1B illustrates a temporal sequence referenced at the transponder T in the desired TDMA format wherein the bursts $B_1$–$B_3$ are illustrated in time sequence separated by a guard time G, and preceded by a frame reference burst FB. As is shown in FIG. 1B, the frame reference burst FB marks the beginning of the frame. Typically, the frame reference burst, sent out by the reference station, includes a unique word, whose detection at each of the other stations is used for receive functions as well as transmit timing. In addition to the unique word, the frame reference burst may also include an identification of the transmitting station, and preferably, may also include a range word which is indicative of the measured and translated range from the reference location to the spacecraft. The range word may either be in terms of absolute range or an offset or error from the nominal range. Furthermore, and in accordance with the present invention, the frame reference burst, at least at times, includes a position index signal.

Figure 2:
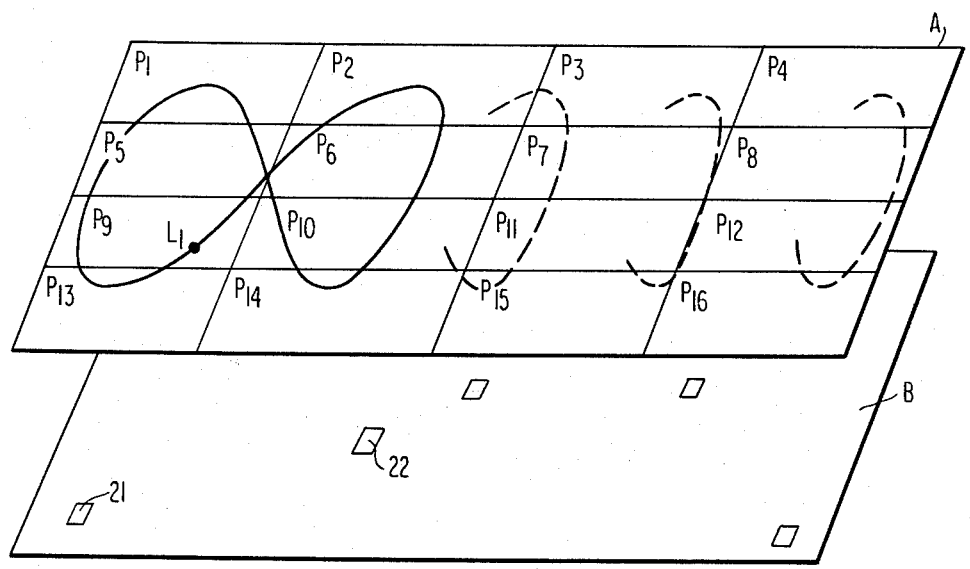
FIG. 2 illustrates projections of spacecraft motion with respect to earth stations.

FIG. 2 is useful in explaining the meaning of the position index signal. FIG. 2 illustrates a simplified and projected showing of spacecraft motion in plane A, and a projection of the location of plurality of stations in a plane B. The locus of spacecraft motion, as illustrated in plane A, does not show any radial component of motion, but since radial motion of the spacecraft is measured and compensated for, this factor does not enter into the derivation or uses of the position index.

As illustrated in plane A, in FIG. 2, spacecraft motion with respect to the surface of the earth is confined to predetermined bounds, the motion itself arises by reason of orbit inclination and eccentricity as well as lunar drag. Thus, while in one short period of time, the spacecraft motion is described by the Lissajous pattern L1, the entire pattern gradually drifts to the right. As the spacecraft approaches the extreme right margin, an engine on the spacecraft is fired to give the spacecraft a velocity toward the left, and thus the pattern moves toward the left with decreasing velocity until it reaches the approximate leftmost boundary where, by reason of lunar drag, the motion is stopped and then velocity increases toward the right. This theoretical "box" in which the spacecraft motion is contained has been divided in FIG. 2 for explanatory purposes into sixteen (16) indices $P_1$–$P_{16}$, and the satellite position index signal identifies one of the sixteen indices within which the spacecraft is present. Those skilled in the art will readily understand that the number of indices may be increased or decreased, and while increasing the number of indices requires additional accuracy in predication or measurement of spacecraft position, as well as an increased bit capacity to transmit the information, it results in a reduction of the necessary guard time since the spacecraft position uncertainty is also reduced. In a preferred embodiment of the invention, actually 256 indices are employed, i.e., the "box" is divided into a sixteen by sixteen matrix.

FIG. 2 is also helpful in illustrating why measurement of satellite range by one of the stations in the system is ineffective to compensate for the range variation caused by the spacecraft motion. Assume, for example, that station 21 measures spacecraft range when the spacecraft is at the position $L_1$. The spacecraft at this point in time is exhibiting motion away from station 21, and this motion can be broken down into a component toward the top, and a second component toward the left. This motion will result in an increase in range between station 21 and the satellite. This increase in range can be detected by taking the difference between two measurements. This can be compensated for by advancing transmit timing to compensate for the additional range. The same motion, however, is toward station 22 and thus the same motion results in a reduction of spacecraft range which can only be compensated for by a retardation in transmit timing to compensate for the reduced range. It should be apparent that the measurement of spacecraft range at station 21 cannot, without much complicated computation, be used to determine a timing adjustment for station 22. In accordance with the invention, the timing adjustments necessary for each different spacecraft index are precalculated with respect to each station and each index and the associated timing adjustments are stored for later use at the respective station.

Figure 3:
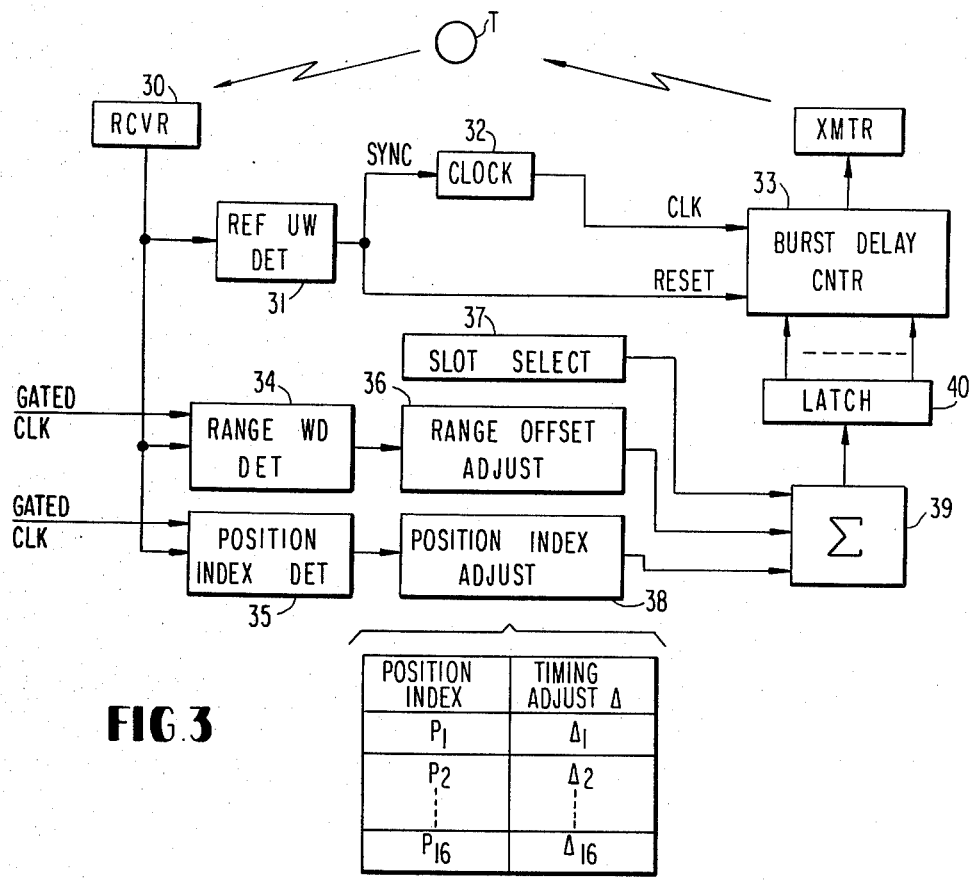
FIG. 3 is a block diagram of a transmit timing circuit located at a typical station.

FIG. 3 is a block diagram of a portion of an open loop TDMA transmit timing apparatus which can be employed at a typical station in an open loop system using a spacecraft position index signal transmitted by the reference station, to compensate for range variations which do not arise by reason of radial motion.

As shown in FIG. 3, a receiver 30 responds to burst signals received from the transponder T. An output of the receiver is available at a reference unique word detector 31 which outputs a signal indicative of the receipt of the frame reference burst or the unique word contained therein. This signal is employed at the transmit clock 32 to synchronize the same, and is also employed at a burst delay counter 33 to reset the same. Those skilled in the art are aware that a station in an open loop TDMA system is enabled to transmit a specified delay after receipt of the frame reference burst, the delay being determined by the specific slot in the frame for which the transmission is aimed, as well as the spacecraft range or range estimate. Once a suitable delay is determined, the transmitter can be enabled by delaying the frame reference burst by the desired amount, and the burst delay counter 33 accomplishes this function by being loaded with a suitable quantity, which, when counted down, for example, by the output of the clock 32, will produce an output signal after the desired delay. The output of the burst delay counter can be used to initiate the station's transmissions.

Generation of the desired delay is determined by three (3) factors, namely, the desired slot in the frame to which the transmissions are directed, a range offset, arranged to compensate for range variations caused by spacecraft radial motion, and a position index adjustment to compensate for range variations caused by spacecraft motion in the plane A. Since the position index only identifies spacecraft absolute position, the timing adjustment depends also on the station's geographical position. Accordingly, the timing adjustment will usually differ for each station for the same spacecraft position index. It should also be apparent to those skilled in the art that the timing adjustment involved can be either an advancement or retardation of the transmit timing and thus, the timing adjustment is a signed number.

Accordingly, each station includes a range word detector 34 and a position index detector 35. Since the range word and position index appear in specified portions of the frame reference burst, they can be simply detected with the use of an appropriately gated clock. Of course, those skilled in the art can readily apply other known techniques for the detection of these particular signals.

The output of the range word detector is coupled to a range offset adjust circuit 36 which merely translates range word (identifying range offset) to timing adjustment. This can be effected in a number of ways; one simple technique is by the use of a look-up table. The output of the range offset adjust circuit 36 identifies the timing adjustment necessary to compensate for the range variation corresponding to that identified by the range word. A slot selector 37 is subjected to an input (not illustrated) to define the desired slot in the TDMA frame for which the transmissions are desired. The output of the slot selector is a quantity representing the desired delay between the receipt of the reference unique word and transmission in order to place the transmitted burst within the desired slot. The delay employed in the slot selector is calculated based on spacecraft nominal position, i.e., with the spacecraft at nominal range.

The output of the position index detector 35, corresponding to the position index word included in the frame reference burst, and identifying the position in the matrix within which the spacecraft lies, is coupled to a position index adjust circuit 38. As shown in FIG. 3, the position index adjust is merely a table translating the position index ($P_1$–$P_{16}$) to timing adjustment $\Delta$. Thus, the output of the position index adjust circuit 38 is a quantity representing the timing adjustment $\Delta$ associated with the position index, and, since this timing adjustment can comprise either an advancement or retardation of the transmit timing, the quantity is also a signed number. The output of the slot selector 37, a range offset adjust 36 and position index adjust circuit 38 are coupled to a summing network 39 which produces, at an output, the quantity representing the algebraic sum of the inputs. This sum is coupled to a latch 40 which, in turn, is employed to preset the burst delay counter on detection of the reference unique word.

It should be apparent from the preceding that as the position index varies, the transmit timing is adjusted, either advanced or retarded, in dependence upon the precalculated timing adjustment desired for the associated position index. It should also be apparent that the precalculated timing adjustment $\Delta$ is unique at each one of the stations since they are geographically unique, and the necessary timing adjustment depends upon the station's location.

Figure 4:
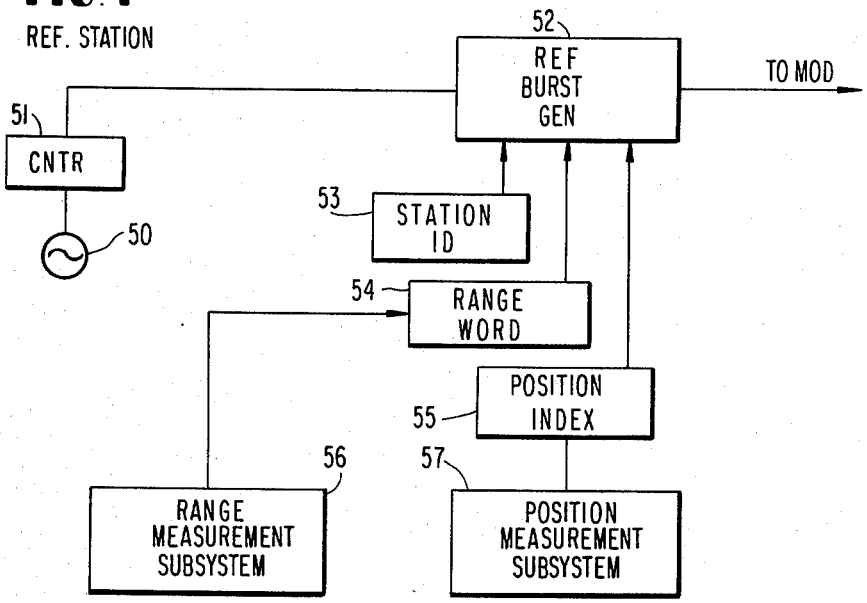
FIG. 4 is a block diagram of a portion of the reference station transmitter for transmission of a Frame Reference Burst including, but not limited to, station ID, range and position index words.

FIG. 4 illustrates portions of the reference station employed to generate the frame reference burst. More particularly, an oscillator 50 drives a digital counter 51 which is used to energize the burst reference generator 52. The burst reference generator 52 has stored therein a representation of the reference unique word, which is coupled out to a modulator each time the generator is energized by the counter 51. In addition, the station has stored a representation of its own identification, which is available to the burst reference generator 52 via the station ID circuit 53. In this fashion, each reference burst includes an identification of the station transmitting the same. Furthermore, the range word circuit 54 is responsive to a range measuring subsystem 56 so as to provide to the burst reference generator the range word representative of radial spacecraft range variations. Finally, a position index circuit 55 is also coupled to the reference burst generator 52 so as to provide the position index word. The position index circuit 55 responds to a position measurement subsystem 57 in order to generate the position index. The range and position measurement subsystem form no part of the present invention and are entirely conventional. The subsystems need not actually make any measurement, and in some situations, a prediction will suffice.

While FIGS. 3 and 4 illustrate preferred embodiments of the invention employing discrete circuits for performing the various functions, those skilled in the art will understand that random access logic, i.e., a minicomputer or the like, can also be employed, being of conventional form, programmed in a suitable fashion.

While specific programs for such a processor have not been disclosed herein, those of ordinary skill in the art will be able to generate suitable programs from a review of this description.

In order to illustrate the advantages derived from employing the invention, an example will be provided. In one open loop application in which spacecraft motion was expected to be bounded by ±0.05°, calculations indicated that stations located at Maine and San Diego will experience ±7 microseconds propagation delay variations, which variations will be out of phase when the reference location is at the Oklahoma Panhandle, for a spacecraft at 120° W. This calculation assumed that spacecraft range to the reference location was accurately known; however, if the reference station were located at one of the extreme locations, then the net error could actually be ±14 microseconds, partly accounted for by actual range variation, and also partly accounted for by errors introduced by measuring range at a station not located at the reference location. In open loop operations, therefore, the total guard time between pairs of bursts from arbitrarily different stations is 56 microseconds. This is the minimum guard time to preclude overlapping bursts. In order to provide for a 90% frame efficiency with such a guard time, each burst must either be 600 microseconds long, or the guard time must be reduced. At a basic TDMA transponder bit rate of 20 MHz., a 600 microsecond burst represents 12,000 bits. If, for example, a 32 Kbps. delta modulation scheme were being used to transmit digitally encoded voice signals in a single burst, a 375 millisecond buffer would be required in addition to the nominal 270 ms. of propagation delay, which could be regarded as excessive in terms of memory requirements and turnaround delay. As those skilled in the art will appreciate, the effect upon lower speed data circuits in the range of 2400 to 9600 bit per second would be even worse than in the example.

This situation can be dramatically improved by employing a position index configured in a 16×16 matrix. Under such circumstances, guard time is reduced to 3.5 microseconds, and the burst duration required for efficient operation would drop to 37.5 milliseconds.

An additional advantage which may be employed, if desired, is that of employing the spacecraft position index as a command to the antenna positioning system in each station so that antenna position can be tracked with spacecraft position without requiring a stand alone antenna positioning subsystem at each of the stations.

What is claimed is:

1. In an open loop TDMA communication system including a reference station, a transponder located on board a spacecraft in quasi-synchronous earth orbit and a plurality of geographically separated stations, in which said reference station periodically transmits a timing marker through said transponder, from which each of said stations derive TDMA transmit timing, apparatus to reduce inter-burst guard time required as a result of spacecraft motion comprising:
   means for transmitting, through said transponder, a spacecraft position index signal,
   and TDMA transmit timing adjusting means, at a plurality of said stations, each of said TDMA transmit timing adjusting means including receiving means for receiving said spacecraft position index signal,
   means responsive to said spacecraft position index signal for determining a corresponding position index timing adjustment unique to said stations, said position index timing adjustment determined by said position index and the geographic location of the associated station, and
   means responsive to said timing adjustment for effecting a corresponding advancement or retardation of station TDMA transmit timing.

2. The apparatus of claim 1 wherein said means responsive to said spacecraft position index signal comprises a storage device storing position index timing adjustment as a function of position index.

3. The apparatus of claim 1 or 2 which includes a clock, synchronized with said timing marker, emitting clock pulses and wherein said means responsive to said timing adjustment includes
   counter means, reset in response to receipt of each of said timing markers and counting said clock pulses corresponding to a predetermined count to produce a burst transmit signal, and means responsive to said timing adjustment for changing said predetermined count.

4. The apparatus of claim 3 wherein said counter means includes
   a burst delay counter,
   means to reset said counter on receipt of each of said timing markers to effect an advancement or retardation of said transmit timing corresponding to said position index timing adjustment.

5. The apparatus of claim 1 wherein each of said stations also includes
   means responsive to a range word for determining a corresponding range timing adjustment,
   summing means for summing said range timing adjustment and said position index timing adjustment,
   said means responsive to said timing adjustment effecting an adjustment corresponding to a sum formed by said summing means.

* * * * *